(12) United States Patent
McClure et al.

(10) Patent No.: US 10,870,928 B2
(45) Date of Patent: Dec. 22, 2020

(54) MULTI-PHASE, VARIABLE FREQUENCY ELECTROSPINNER SYSTEM

(71) Applicant: Ian McClure, Melbourne, FL (US)

(72) Inventors: Ian McClure, Melbourne, FL (US); Scott Baskerville, Melbourne, FL (US); Ryan Bailey, Melbourne, FL (US)

( * ) Notice: Subject to any disclaimer, the term of this patent is extended or adjusted under 35 U.S.C. 154(b) by 658 days.

(21) Appl. No.: 15/408,380

(22) Filed: Jan. 17, 2017

(65) Prior Publication Data

US 2018/0202075 A1 Jul. 19, 2018

(51) Int. Cl.
*D01D 5/00* (2006.01)
*B29C 41/00* (2006.01)
*D04H 1/728* (2012.01)
*B05B 5/00* (2006.01)

(52) U.S. Cl.
CPC ............ *D01D 5/0092* (2013.01); *B05B 5/005* (2013.01); *B05B 5/008* (2013.01); *B29C 41/006* (2013.01); *D01D 5/0061* (2013.01); *D04H 1/728* (2013.01)

(58) Field of Classification Search
CPC ...... D01D 5/0092; B05B 5/005; B05B 5/007; B05B 5/008; B29C 41/006
See application file for complete search history.

(56) References Cited

U.S. PATENT DOCUMENTS

| 2,158,415 | A | * | 5/1939 | Formhals | D01D 5/0076 264/10 |
| 3,440,458 | A | * | 4/1969 | Knight | H02N 3/00 310/11 |
| 3,806,763 | A | * | 4/1974 | Masuda | B05B 5/088 361/227 |
| 4,011,991 | A | * | 3/1977 | Masuda | B05B 5/007 239/708 |

(Continued)

FOREIGN PATENT DOCUMENTS

| EP | 2456911 B1 | 1/2011 |
| WO | 2008106381 A2 | 9/2008 |
| WO | 2014094694 A1 | 7/2014 |

OTHER PUBLICATIONS

Maheshewari, Siddhartha. Alternatng Current Electrospraying. Industrial and Engineering Chemical Research. Published on the Web Apr. 24, 2009., pp. 9358-9368, Issue 48 copyright 2009 by American Chemical Society.

(Continued)

*Primary Examiner* — Atul P. Khare
(74) *Attorney, Agent, or Firm* — Wolter Van Dyke Davis, PLLC; John L. DeAngelis; Cian G. O'Brien

(57) ABSTRACT

An apparatus for producing a fibrous material. The apparatus uses a first material source within which is disposed a first material and a second material source enclosing a second material. The first and second materials to be electrospun. A first and second tip attached to an end of the first and second (Continued)

material sources, with a collector spaced apart from the first and second material sources. A first and second electric field generator each produces a first and second signal each in the form of a sine wave and having a first and second frequency. The fibers are formed from the first and second materials as extracted from the respective first and second tips responsive to a first and second electric field generated between the respective first and second tips and the collector.

20 Claims, 13 Drawing Sheets

(56) References Cited

U.S. PATENT DOCUMENTS

| | | | | |
|---|---|---|---|---|
| 6,252,129 | B1* | 6/2001 | Coffee | A61F 13/00085 239/3 |
| 7,134,857 | B2* | 11/2006 | Andrady | B82Y 30/00 425/66 |
| 7,789,930 | B2 | 9/2010 | Ensor | |
| 8,163,227 | B2* | 4/2012 | Sumida | D01D 5/0069 264/103 |
| 8,211,352 | B2 | 7/2012 | Baca | |
| 8,652,229 | B2 | 2/2014 | Ensor | |
| 2002/0090725 | A1 | 7/2002 | Simpson | |
| 2002/0100725 | A1 | 8/2002 | Lee | |
| 2003/0226750 | A1 | 12/2003 | Fenn | |
| 2008/0145655 | A1 | 6/2008 | Hellring | |
| 2011/0018174 | A1 | 1/2011 | Baca | |
| 2011/0174158 | A1* | 7/2011 | Walls | B01D 39/1623 96/60 |
| 2018/0073165 | A1* | 3/2018 | Laidmae | D01D 5/0069 |

OTHER PUBLICATIONS

Zargham, Shamim. The Effect of Flow Rate on Morphology and Deposition Area of Electrospun Nylon 6 Nanofiber. Journal of Engineered Fibers and Fabrics, pp. 42-49, vol. 7, Issue 4, 2012.

Maheshewari, Siddhartha. Assembly of Multi-Stranded Nanofiber Threads Through AC Electrospinning. Advanced Materials, pp. 349-354, vol. 21, 2009.

Yang, Xinghua. Preparation and Characterization of ZnO Nanofibers by Using Electrospun PVA/Zinc Acetate Composit Fiber As Precursor. Inorganic Chemistry Communications, pp. 176-178, 2004.

Yeo, Leslie. AC Electrospray Biomaterials Synthesis. Biomaterials, vol. 26, pp. 6122-6128, Available online May 12, 2005.

Zhu, Ziming, et al. The Process of Wavy Fiber Deposition Via Auxiliary Electrodes in Near-Filed Electrospinning. Applied Physics, 2015. 120:1435-1442.

* cited by examiner

MULTI-PHASE, VARIABLE FREQUENCY ELECTROSPINNER SYSTEM

CROSS REFERENCE TO RELATED APPLICATIONS

This patent application claims the benefit of U.S. provisional patent application filed on Jan. 15, 2016 and assigned Application No. 62/279,067, which is incorporated herein in its entirety.

FIELD OF THE INVENTION

The present invention relates generally to a modulated signal electrospinner system and specifically to a modulated signal electrospinner system using multiphase and multifrequency signals.

BACKGROUND OF THE INVENTION

A prior art DC electrospinning system produces fibrous material out of a dissolved or melted solute. This is accomplished using a combination of chemical principles and high voltage electricity. A typical DC electrospinner has a solute (normally a plastic or a polymer) dissolved in a powerful solvent and placed in syringe or similar fluid storage vessel. The fluid is electrified from a high voltage DC power supply ranging from about 3.3 KV to about 100 KV, thereby creating a highly charged medium. This fluid is then pumped into a syringe nozzle having a diameter of between about 16 ga and 40 ga.

In addition to a syringe based electrospinning system, electrified fluid can be "presented" in the form of a vat that can be charged either evenly with a mesh, or through more complicated techniques such as a rolling drum, bubbles, or other mechanisms that can provide a charge at a point or set of points in the fluid. Electrospinning has also been accomplished through mechanical means of a charged, high speed spinning wheel coated in the electrospinning fluid.

Nanofibers, which can be formed using an electrospinning system are useful in a variety of fields from clothing industry to military applications. For example, in the bio-substance field, nanofibers provide a scaffolding for tissue growth effectively supporting living cells. In the textile field, nanofibers have a high surface area per unit mass that provides light but highly wear-resistant garments. Carbon nanofibers are used in reinforced composites, in heat management, and in reinforcement of elastomers. Many potential nanofiber applications are under development as the ability to manufacture and control their chemical and physical properties improves.

Electrospinning techniques are used to form particles and fibers as small as one nanometer in a principal direction. The related concept of electrospray forms a droplet of a polymer melt at an end of a needle. An electric field charges the droplet and parts of the droplet are expelled because of the repulsive electric force due to the electric charges. A solvent present in the parts of the droplet evaporates and small particles are formed.

The electrospinning technique is similar to the electrospray technique. However, during expulsion fibers are formed from the liquid as the parts are expelled from the needle.

The fibers are drawn toward a grounded metal object, called the collector, which is positioned a predetermined distance from the electrospinning fluid source. This object may comprise, for example, a plate or a rotating drum; but the collector object must be grounded or have a negative charge, either will work in a DC system.

As the charged fluid exits the source and flows toward the grounded collector (or the charged fluid in the vat), it begins to form a Taylor Cone at the tip of the nozzle (or for the charged fluid in the vat, at the closest point of the fluid to the collector). A Taylor Cone is a cone-shaped fluid mass formed at the very tip of the nozzle and extending from and external to the nozzle. In a vat system, multiple Taylor cones form on the closest surface, whether that be the electrified fluid surface, a roller, bubble, or other charge focusing mechanisms.

A basic electrospinning apparatus 10 is shown in FIG. 1 for the production of nanofibers and other material fibers. The apparatus 10 creates an electric field 12 that guides a polymer melt or solution 14 (i.e., a fluid mass) extruded from a tip 16 of a needle 18 to a grounded object or electrode 20. A nozzle 22 stores the polymer solution 14. Conventionally, one end of a voltage source (not shown) is electrically connected directly to the needle 18, and the other end of the voltage source is connected to the electrode 20. The electric field 12 created between the tip 16 and the electrode 20 causes the solution 14 to overcome cohesive forces that hold the polymer solution together, causing a jet of the solution 14 to be drawn from the tip 16 toward the electrode 20 by the electric field 12 (i.e., a process referred to as electric field extraction). The polymer dries during flight from the needle 18 to the electrode 20 to form fibers. The fibers are typically collected downstream on the electrode 20.

A polymer solution is one example of the different materials that can be used to form the fibers.

FIGS. 2A, 2B, and 2C illustrate successive steps in the formation of the Taylor Cone at the tip 16. FIG. 2A illustrates the tip 16 with no fluid in the nozzle 18. FIG. 2B illustrates the tip 16 with a fluid mass 14, but without a voltage differential between the fluid and a spaced-apart grounded object (not shown in FIG. 2B). FIG. 2C illustrates the Taylor Cone 21 as it begins to from as the charged fluid 14 exits the tip 16 and flows toward the collector 20.

Within the tip 10, the charged fluid begins to form fibers due to the significant charge differential between the electrified fluid and grounded collector. The charged fluid within the tip attempts to lower its energy state by shorting to the collector, forming charged fibers and ejecting the charged fibers from the Taylor cone tip. In just a few minutes, a copious amount of the fluid is piled on the collector as loose and random fibers if the collector is a plate or flat surface. If the collector is a rotating drum the fibers are disposed on the drum as loose but aligned fibers.

The inability to control fiber formation and fiber structure, and the lack of interconnection between the fibers makes electrospun fibers of questionable value for scaffolding purposes or for making nanostructures of any useable mechanical strength or having desirable physical properties. Given these disadvantages, there is no technique for creating a controlled nanostructure, beyond very small scale production.

BRIEF DESCRIPTION OF THE DRAWINGS

The skilled artisan will understand that the drawings, described below, are for illustration purposes only. The drawings are not intended to limit the scope of the present invention in any way.

FIGS. 15-17A, 17B, and 17C illustrate vacuum tube embodiments for use with the present invention.

DETAILED DESCRIPTION OF THE INVENTION

Before describing in detail the particular methods and apparatuses related to an electrospinning process, it should be observed that the embodiments of the present invention reside primarily in a novel and non-obvious combination of elements and method steps. So as not to obscure the disclosure with details that will be readily apparent to those skilled in the art, certain conventional elements and steps have been presented with lesser detail, while the drawings and the specification describe in greater detail other elements and steps pertinent to understanding the embodiments.

The presented embodiments are not intended to define limits as to the structures, elements or methods of the inventions, but only to provide exemplary constructions. The following embodiments are permissive rather than mandatory and illustrative rather than exhaustive.

For simplicity, the mechanics of an electrospinner system are described only for the syringe-based, but those skilled in the art can apply the teachings of the present invention to any vessel-based system.

Electrospinning has promise to control fiber formation as it can produce complex nanostructures with exceedingly precise control over the shape, size, fusing rate, weave, and fiber thickness. To accomplish certain of these advantages, a high voltage alternating signal (i.e., as defined by a signal frequency and peak amplitude) is used in lieu of a DC voltage. This signal can be applied to the fluid only, or different signals can be applied to the fluid and the collector.

Some interesting effects occur with this arrangement. The Taylor Cone pulses at twice the frequency of the signal voltage. This is a result of the continual polarity shift of the signal and thus the polarity shift of the fluid charge. Herein "pulse" refers to a peak magnitude (both positive and negative) of the signal voltage.

Figure 3:
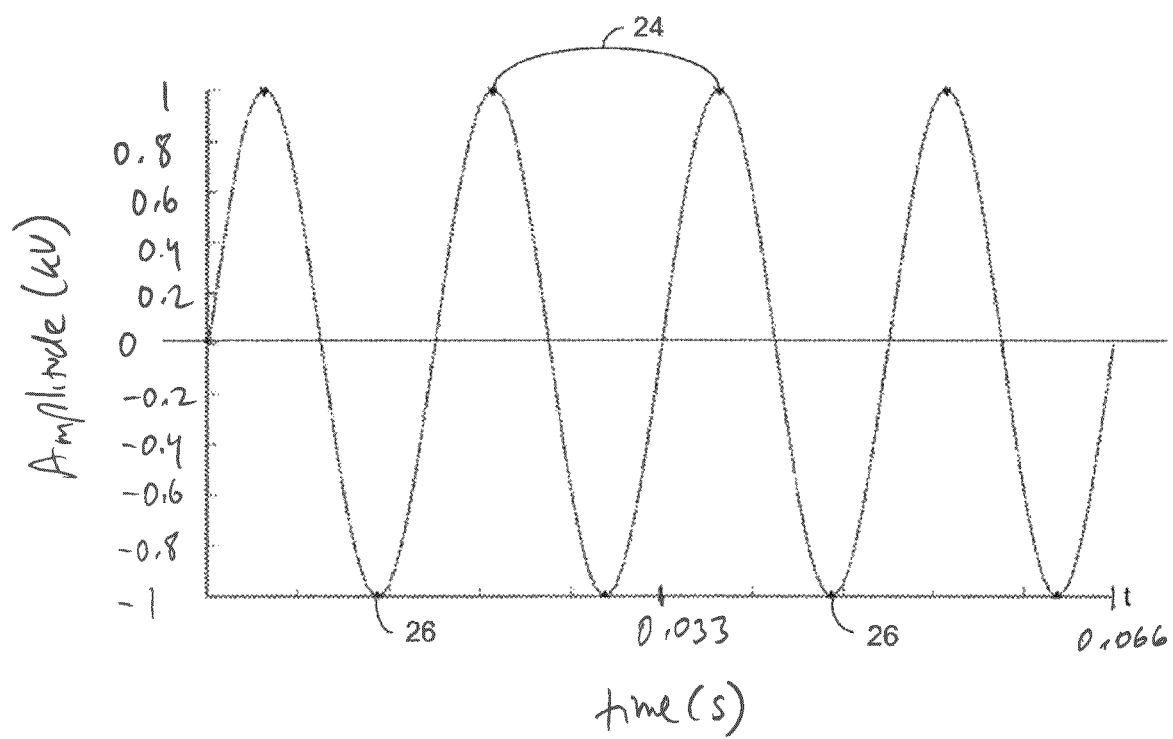
FIG. 3 illustrates a sine wave for use with the electrospinner system of FIG. 1.

FIG. 3 depicts a 60 Hz sinusoidal voltage with positive peaks identified with reference numeral 24 and negative peaks with reference numeral 26.

At each peak or maximum positive/negative voltage of the sinusoidal waveform the dissolved material forms into fibers. Those fibers are charged with the waveform polarity at the time they are ejected from the nozzle tip and thus the region of the Taylor Cone carrying those fibers carries the same charge. The fiber charge polarity alternates at the frequency of the signal voltage. This changing fiber polarity results in fibers with opposite polarities that are attracted or repelled from each other to create an interwoven, interconnected mesh of material as the fibers interact at the grounded object.

Various types of materials can be used with the modulated (or signal based) electrospinner, with the properties of the final woven product based on the selected material and the charging signal.

The frequency of the waveform can be selected to control the rate of fiber fusing, the tightness of the weave, the thickness of the fiber, and the shape of the final interwoven mesh. As a general rule: as frequency increases, the mesh becomes tighter, the fibers smaller, and more fibers are fused in the formed product.

Controlling an electrospinner driven by a sinusoidal waveform is relatively simple when dealing with a single phase, single frequency signal. The signals can be generated by any number of devices, but ideally a computer or waveform generator (also referred to as a signal generator) is used for maximum flexibility over the waveform shape and magnitude.

Preferably, the signal is coupled from the signal generator to an impedance-matched amplifier, then supplied to the electrospinning fluid. The simplest model of this system is illustrated in FIG. 4.

Figure 4:
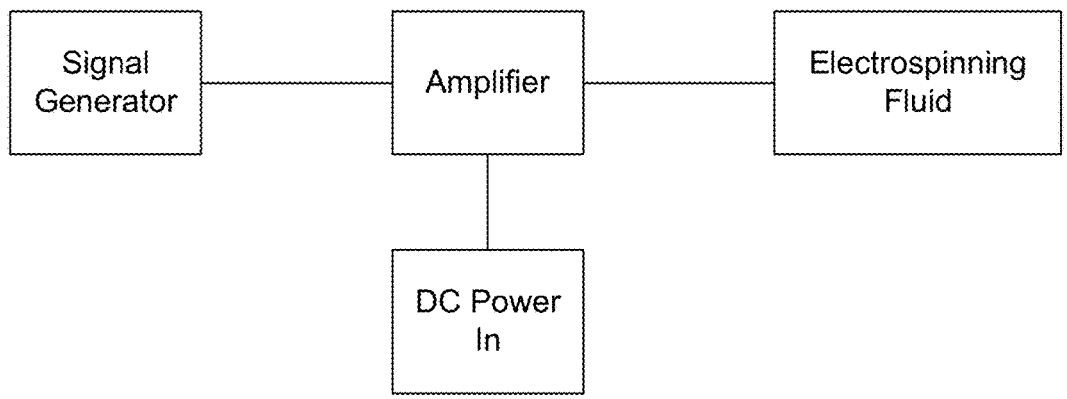
FIGS. 4 and 5 illustrate a block diagram electrospinner systems.
Figure 5:
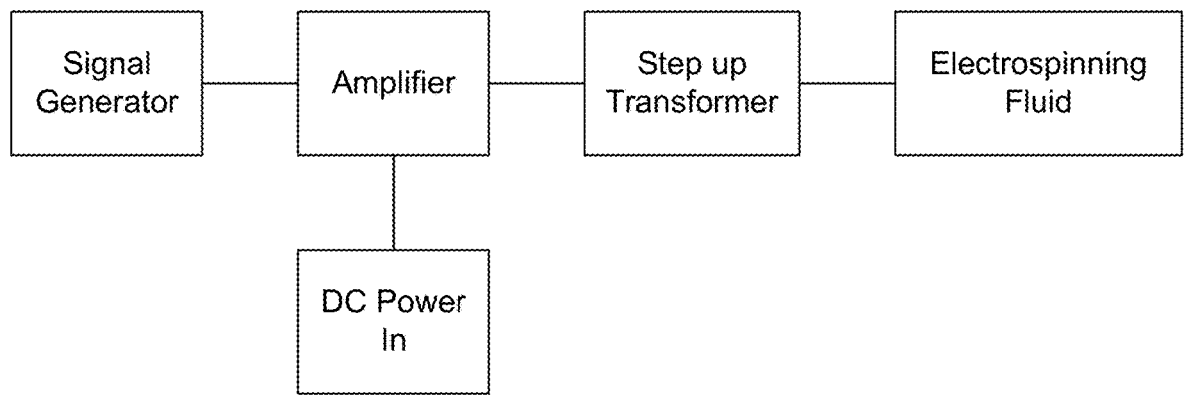

In practice, the system is not as simple as FIG. 4 might suggest. Most amplifiers increase the power of the output signal relative to the input signal, but not the output voltage. To accomplish the latter, a step up high voltage transformer is required as shown in FIG. 5 with a step-up voltage transformer disposed between the amplifier and the electrospinning fluid.

Figure 1:
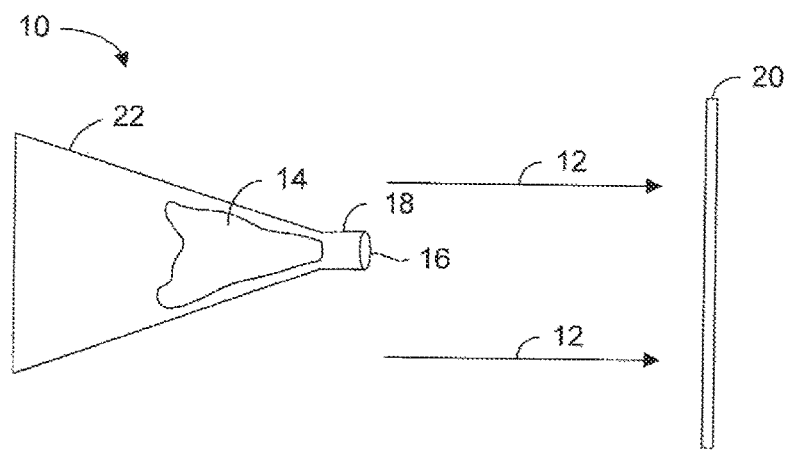
FIG. 1 illustrates an eletrospinner system.
Figure 2A:
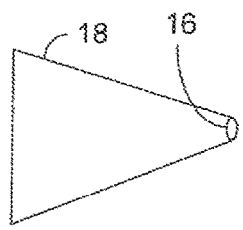
FIGS. 2A, 2B, and 2C illustrate successive steps in the formation of a Taylor cone during the electrospinning process.
Figure 2B:
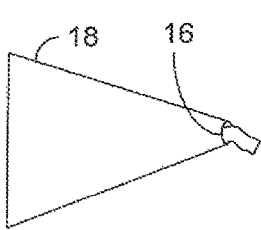
Figure 2C:
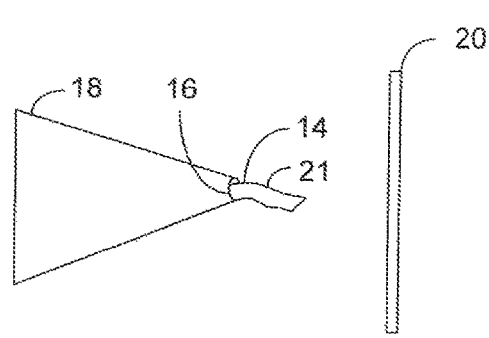

In an embodiment comprising two or more nozzles each carrying a different material and each driven by a different signal, an array of high voltage transformers is required, one transformer for each electrified fluid mass 14 of FIGS. 1, 2B, and 2C.

While the use of a simple sinusoidal signal to charge the electrospinner fluid may not be novel, significant material properties and features can be obtained and the electrospinning process improved using complex waveforms to charge the fluid.

For example, according to one embodiment of the invention, the signal generator supplies a variable frequency signal or a signal comprising multiple frequencies to the amplifier. The resulting fibrous structures are more complex than available using a single frequency signal.

In another embodiment, multiple frequency signals are used to charge electrospinning fluids comprised of different materials, thereby forming hybrid structures on the grounded object.

Figure 6:
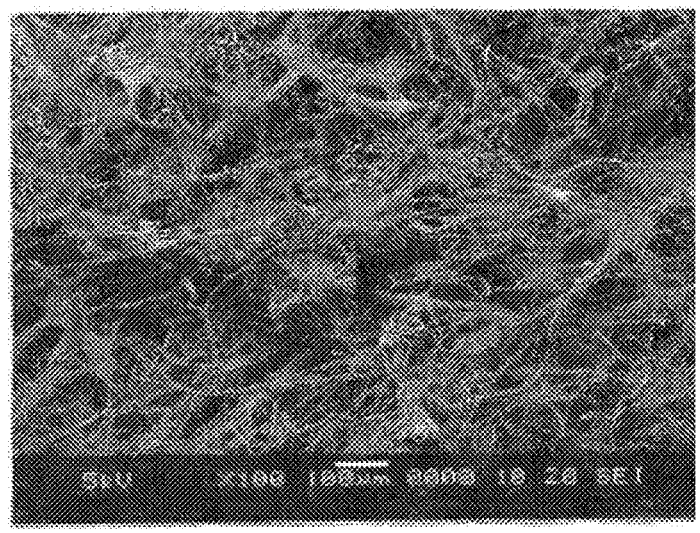
FIG. 6 is a scanning electron micrograph of a fiber material constructed according to the teachings of the present invention.

For example, to create a large, thick fiber structure with thin interlacing fibers between each strand, the signal generator simultaneously supplies both a lower frequency (e.g., 50 Hz) signal and a higher frequency (e.g., 1 kHz) signal to the fluid. See FIG. 6.

The use of a multiple-frequency signal creates a complex structure that is essentially a combination of a structure formed by a 50 Hz signal and a structure formed by a 1 kHz structure. Both signals are applied to the same fluid at the same time, resulting in a complex composite signal.

Figure 7:
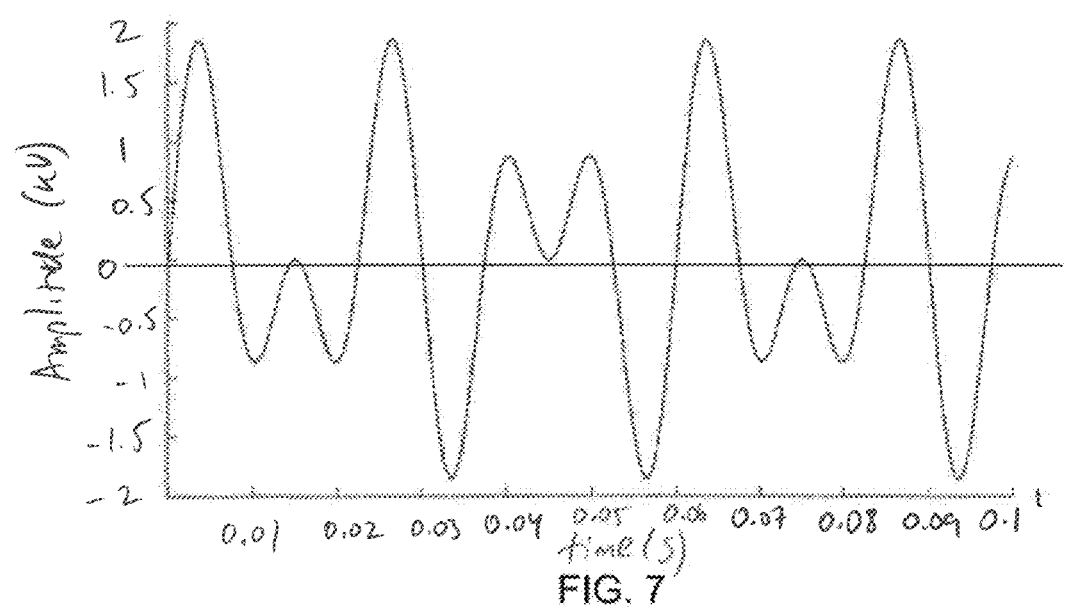
FIGS. 7-12 illustrate various signal waveforms suitable for use with the electrospinning system of the present invention.

An example of such a multiple-frequency signal is illustrated in FIG. 7, e.g., a combination (sum) frequency signal. Using such a signal to charge the fluid creates a fibrous material with unique properties. The higher frequency causes the formation of a material with a thinner, stronger, and stiffer fibrous structure, while the lower frequency signal provides a thicker, more flexible but weaker fiber material. When the combined signal is applied to a solution comprising only a single material, the resulting electrospun material is a homogenous mix of the two fiber types into a single material composite with unique material properties.

Figure 8:
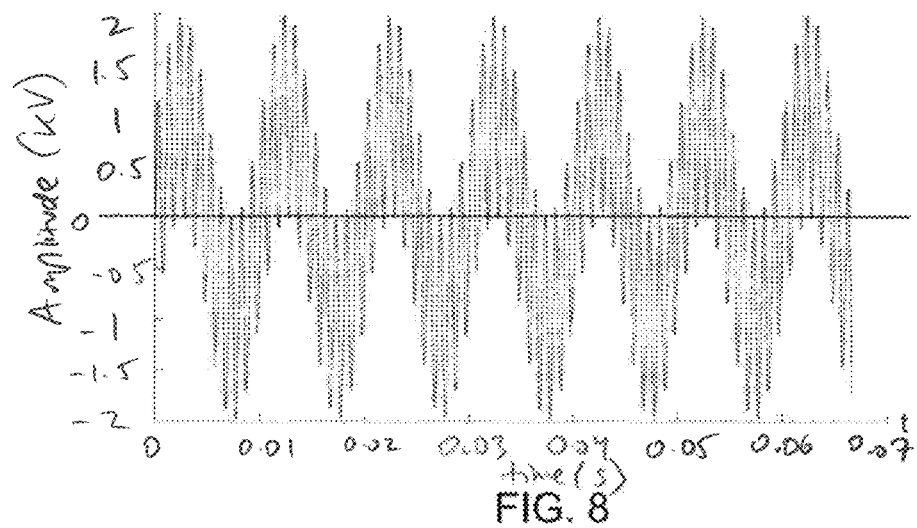

FIG. 8 illustrates a sum of a 100 Hz and 1 kHz signal. Note that the 1 kHz signal appears as noise riding on the 100 Hz signal.

It should be noted that the number of frequencies that can be used in the electrospinning process is unlimited and the selection of specific frequencies is infinite. Only two frequency signals have been described to simplify the present discussion.

Figure 9:
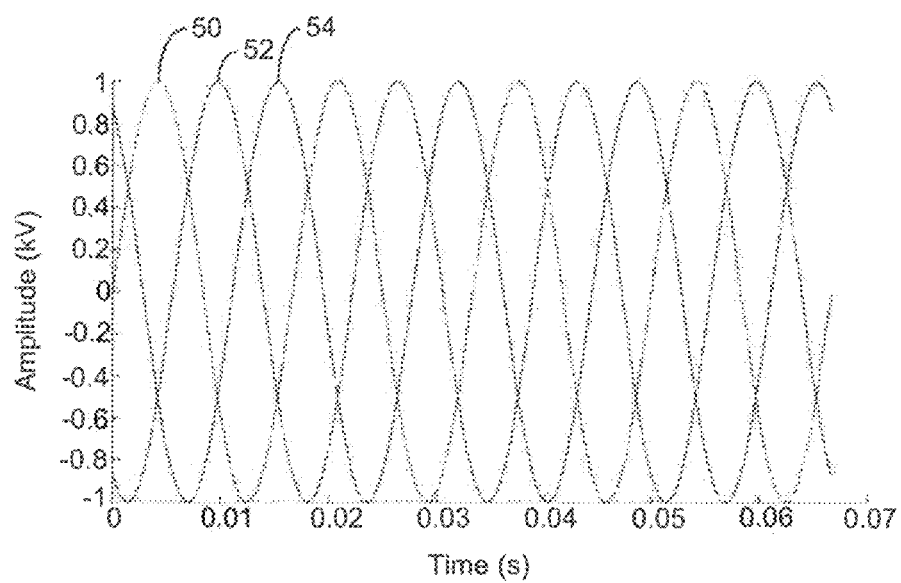

The characteristics of the resulting fibrous material can be further controlled by using a multiphase signal, for example, a three-phase signal. A three-phase signal is illustrated in FIG. 9 with each signal 50, 52 and 54 having the same frequency but the three signals offset (or out-of-phase) by 120 degrees. This is found in industrial three-phase power applications such as motors, but rarely outside of that setting.

The three-phase signal illustrated in FIG. 9 can be applied to a single fluid mass (such as the fluid mass 14 of FIG. 1) or in an embodiment comprising three electrospinning systems (such as three of the systems 10 illustrated in FIG. 1), one of the three phased signals applied to each of the electrospinning systems 10.

The use of multiphase signals in electrospinning provides additional properties and characteristics by allowing multiple materials to be simultaneously electrospun. Each material is electrified individually by one phase of the multiphase signal. Each phase is used on a different electrospinning fluid to produce an independent material, or even multiple units of the same fluid. The phase angle allows for control of interaction between each independent material. For example, with reference to the three phase signals 50, 52, and 54 of FIG. 9, each phase charges one of three different materials that are combined at the ground plate or drum. Since at any given instant of time the three signals are at different points along their individual waveforms, a potential difference exists between the signals and this potential difference pulls the fibers together into a composite material having a unique pattern.

The use of multiphase signals also controls interaction of each material according to the phase angle between the multiple phase signals. Again, controlling the phase and/or frequency of the signals (three in an embodiment with three fiber sources) produces a material with unique properties.

The inventors have discovered that as the phase angle difference between any two of three signals (in a three signal/three fiber sources embodiment) approaches 180°, the interaction between the two generated fibrous materials increases.

The use of multiphase signals allows for the fusing and interweaving of unlike materials, with the phase angle difference driving the fusing and interweaving properties.

For example, if the desired properties of the end product are conductive, flexible, and relatively strong, a three-signal system can be used to create a three-material electrospinner system to produce the end product. Such a three-signal system uses copper as the conductive material, silicone as the flexible material, and tool steel as the strong material.

A 1-to-3 phase splitter can be used to convert a single-phase signal into a three-phase signal with 120° between each phase. The fibrous material produced from each one of the three electrospinners is substantially the same because the three phase signals each have the same frequency, but they will come together in the composite material in a unique way. Further improvements and refinements can be made to this basic three-phase system as described elsewhere herein.

To gain better control of the phase angles and in lieu of using the phase splitter referred to above (resulting in equal phase angle between every two of the three signals), the phase of each signal can be independently controlled relative to the phase of the other signals. This independent control allows exact phase angles to be specified for each signal relative to the other signals.

This is easily done when audio software provides the signal generating function as each channel can be controlled to operate independently of the other channels. For higher frequencies, special high-frequency hardware for signal generation and phase control can be used. By slightly delaying one or more of the signals relative to the other signals the phase angle between any two signals is controlled.

With reference to the example using copper, silicone, and tool steel, the phase angle between the copper and steel is controlled to a fairly shallow value (about 20° or so) and the phase angle of the silicone to be 170° out of phase with each metal. This is feasible approach because phase angles have a ceiling of 180° and a floor of −180°, resulting in a functional 360° of phase difference available for manipulation.

The signals driving the copper and steel electrospinning processes are set with a relatively small phase angle difference because each of those materials is a crystallized metal. The phase angle for the silicone process is significantly offset from copper and steel because the silicon is an amorphous solid, unlike copper and steel. With such independent phase angle control the structures as formed by each material will be substantially the same as if they were electrospun independently, except for the fact they will bind and weave with the other materials electrospun simultaneously.

In another embodiment, in addition to independent control of the phase angles of the three (or more or fewer) signals, to provide more control over and more variability in the electrospun material, each signal frequency is independently controlled to a different value.

The concept of a phase angle difference between two signals is particularly problematic because by definition, a phase angle difference can exist only between two signals of the same frequency. For example, the phase difference between two 60 Hz power line signals. Thus, the scope of the present invention includes as least two or more same-frequency signals at different phase angles and two more signals of differing frequencies.

Additionally, if the signals are improperly manipulated (as caused by poor reproduction of the signal in a carrier wave of low fidelity) signal integrity cannot be maintained. Noise and harmonics can cause signal distortions that cause unwanted physical properties in the electrospun material.

This difficulty is resolvable by using square waves where possible to modify the signal as set forth in the equation below.

$$\text{phase leg} = A_1 \times \prod (2\pi f + \varphi) + A_2 \frac{s_1 + s_2 + s_3 + \ldots + s_n}{n} \quad \text{Equation 1}$$

Phase setting equation for unlike signals

Where $A_1$ is the amplitude of the square wave envelope or carrier signal, $A_2$ is the amplitude of the individual electrospinning signals, $\pi$ is the square wave function, which can in other embodiments be any waveform. A square wave tends to be an ideal choice (but not a necessary choice) because it does not distort the signal output to the electrospinner, f is at least half of the lowest frequency component from the signal (if the lowest frequency within the electrospinning frequency is 60 Hz, then f should be 30 Hz or less). In another embodiment, this can be larger than half, but it will begin to "chop" the signal. $\varphi$ is the desired phase angle of the signal driving one of the fiber sources to the specific material, which can be at the user's discretion for a given application. $s_x$ represents the individual frequency components that make up the signal and can represent any periodic signal such as sine, cosine, square, saw-tooth, or another repeating signal. It can be any time variant signal such as a radar sweep or any variation in signal magnitude, which may not define a known waveform function. Finally, n is the number of frequency components within the signal, to normalize the magnitudes of each component within the overall signal.

Most of this equation is easily derived from empirical data and simulation, but the f is intuitive and based upon Nyquist's Theorem. If a signal is manipulated to fit within a slower carrier wave, usually square wave, as a means of creating a phase the signal should be able to complete at least one cycle before being inverted by the carrier wave. This carrier wave is used in each phase leg (each independent power line) at the exact same frequency but the phase angle between each leg is controlled from by the user. If, for example, the composite signals generated as described elsewhere herein are attempted to be set with a phase angle relative to each other.

Figure 10:
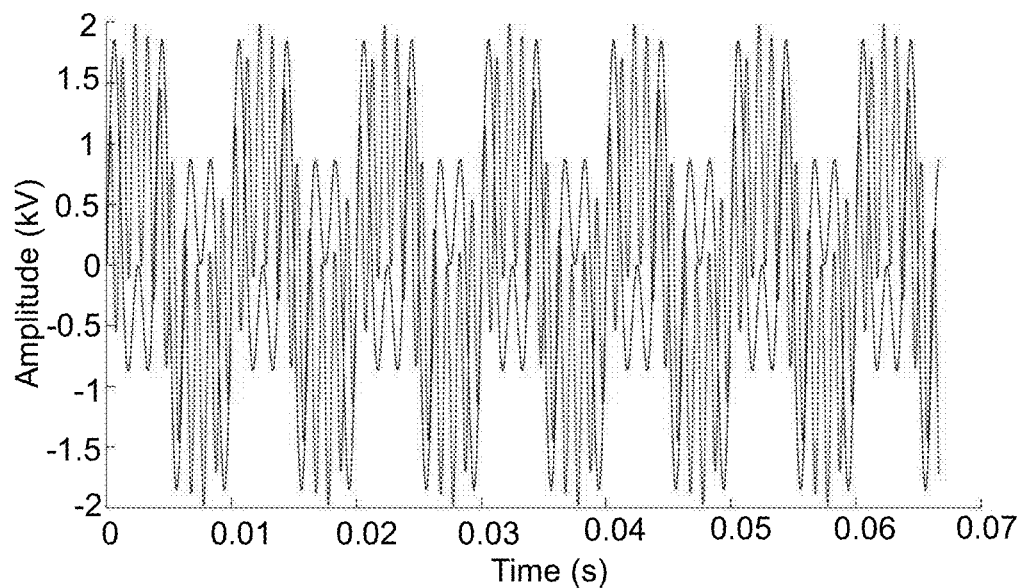

FIG. 10 illustrates a square envelope using unmatched signals without setting a specific phase angle between the signals. Very little interaction occurs between the two signals of the electrospinner because there is no existing phase angle, nor is there much voltage potential difference between the signals.

Instead, if a square wave of 50 Hz and a phase angle of $$\frac{\pi}{2}$$

Figure 11:
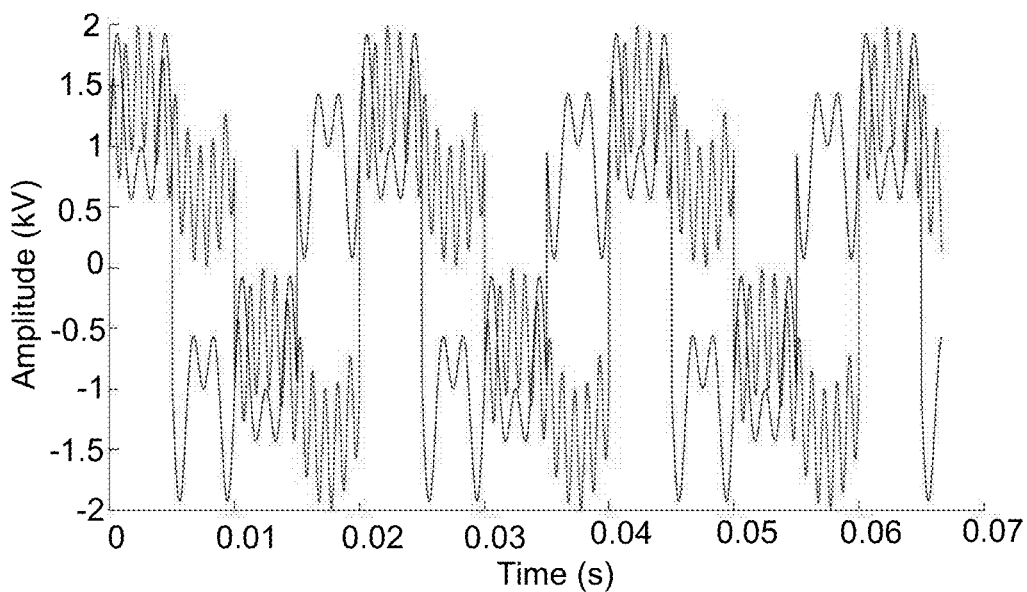
Figure 12:
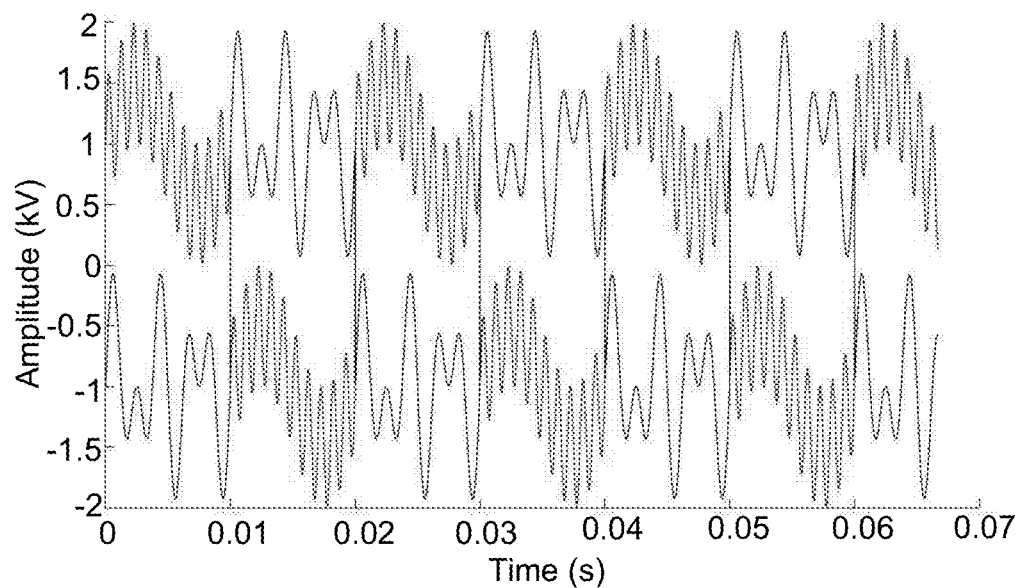

(or 90°) are used in Equation 1, the resulting signal is shown in FIG. 11. See also FIG. 12, which illustrates a composite signal.

The signals clearly have a phase relationship to one another, and now can be used as if the system signals were the same in each line. This allows for a multifrequency, multiphase system to operate with independent and distinct phase legs, resulting in unique structures for each material while still having the phase based interelated.

The extent of the interaction can be estimated based on the area between the two curves, which is an integral of the voltage over change in time.

Note, there are downsides to working with multiphase signals. The peak-to-peak voltage (Vpp) in the original signal is now $$\frac{1}{n}$$

of what it was before the manipulation, but the overall Vpp is still the same. Simply put, to pack more sub signals into the electrospinning signal, each one has a smaller impact as their amplitudes diminish. The amplitude of the overall signal is not changed, but the impact of each sub component or sub signal as more are added is reduced. This is reversible by merely running the system at an amplitude of $nA_2$ to compensate, but the overall system must be capable of the new amplitude.

In an electrospinning system that uses multiple signals at different or the same frequencies and different phase angles for the same-frequency signals, with multiple materials, with the signal frequency, phase, and amplitude independently controlled, provides the ability to form a composite material having desirable properties. Such a system is a substantial improvement over a single frequency system as in the prior art.

To create a multifrequency signal, the signal generator must be able to produce more than one frequency, and combine them as needed for the application. Computer software is still the ideal signal generation, either audio software for lower frequencies such as Audacity, or for higher frequencies on a custom signal output hardware, MATLAB or a similar software-controlled signal generator is acceptable.

The use of multiphase signals demands a multichannel output that has precision timing controls, such as that of a surround-sound system for lower frequency uses, or a custom hardware system built to desired specifications.

Figure 13:
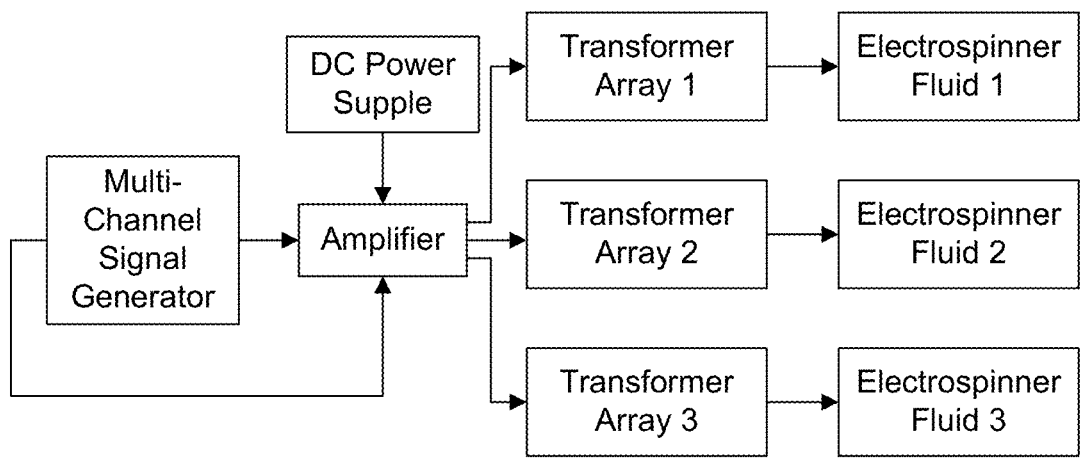
FIG. 13 illustrates a block diagram of electrospinning system for use with three fibers.

A block diagram of such a system is set forth in FIG. 13, which depicts a three-phase system for controlling three electrospinners, but any number of phased signals and electrospinning systems can be used.

The three phases and the components associated with each phase bear the same numerical reference (1, 2, and 3). As in the embodiment of FIG. 5, the signal generator outputs to the amplifier, which in turn feeds the signal to a transformer the output of which controls ejection of the electrospinning fluid. A transformer array merely comprises a bank of transformers with each transformer responsive to a different signal so that the array handles multiple phases. Each phase requires at least one transformer, and if more than one is required, the transformers are connected in series. The principal difference with the FIG. 5 single signal embodiment is that the signal generator and amplifier of FIG. 13 must be multichannel for the multiphase system to operate properly.

In another embodiment, due to the limitations of modern amplifiers at higher frequencies, older technologies have been used, as they offer distinct advantages over modern approaches. In one embodiment, the older technology involves the use of vacuum tubes, more specifically, power beam tetrodes.

The design presented herein is only an exemplary model; as those skilled in the art are aware other designs can be utilized. However, this technology offers certain advantages within the scope of the present invention, which may be referred to as a multi-phase variable frequency signal modulated electrospinner. It is therefore a viable and appealing alternative to the use of transformers or semiconductors.

Transformers are by far the most common device for increasing (or decreasing) a voltage. Through a simple induction process using proximate wire coils, a transformer can increase or decrease an input voltage with reasonable (if not exemplary) power efficiency. The ratio of turns between a primary and a second coil dictates the ratio of voltage increase (and current reduction).

For example, a 120 Vrms input to a primary coil having 120 turns paired with 2,000 turn secondary or output coil results in a 2,000 Vrms output. Use of a ferromagnetic core located to increase the coupling between the primary and secondary coils improves the efficiency and reduces transformer losses. By this example, it seems there is very little limitation to what a transformer can do.

The primary transformer limitation relates to the core material. Standard transformers have a laminated iron core, which consists of thin sheets of epoxy-coated metal oriented orthogonally to the coil windings. This arrangement provides efficient magnetic field permeation through each sheet of metal without significant losses due to electromagnetic eddy currents.

These losses manifest in the form of heat, which if left unchecked will melt the core. This "inefficiency" is the premise of an induction forge, which are purposefully designed to use this phenomenon to superheat metals.

The problem of eddy current losses becomes more pronounced as the frequency increases. With higher signal frequencies, more "electrical friction" is generated via eddy currents and core overheating becomes more likely. By using more exotic metals, such as amorphous or silicon steel, when working in audio frequencies or higher (400 Hz to 100 KHz) the risk of overheating the transformer core is reduced, but efficiency drops significantly after the applied signal frequencies reach about 80 kHz.

Ferrite cores and air cores (meaning a lack of a specific core material) are the standard for higher frequency applications, though some of the system's efficiency and flux density are sacrificed. The flux density dictates how many turns per volt are required before core saturation occurs. The less ferromagnetic material contained within the core, the lower the flux density and thus more turns of wire are needed per coil for the same voltage. This means that if an air core is needed because of a high frequency application, the number of turns for the same voltage, input and output, will be much higher than a lower-frequency system implemented with an iron core. For example, in a step-up transformer increasing 120 v to 240 v, with a good silicon steel core, the flux density is 1 v per turn, so the primary is 120 turns and the secondary is 240. In an air core transformer with similar cross sectional area it may be much lower such as 1 v per 8 turns, and thus the primary has 960 turns and the secondary has a 1920 turns. Note the ratio between the turns stays the same, but the amount of wire needed increases dramatically.

These extra turns also lead to parasitic capacitances between the windings of the coil and the increased resistance of the longer wire required to form the appropriate number of coil turns. These inefficiencies exist in every transformer, but they are negligible if the frequency and number of turns are both relatively low. As frequency increases, the stray inductance of the non-ideal coils and the parasitic capacitances result in an even larger energy loss and can eventually lead to distortions in the signal. These distortions may be considered as an "interfering signal" and change the properties of the electrospun material. This is because each distortion is frequency dependent and different for each unique system. Even with the best shielding, these coils will pick up other signals and interferences that will provide a challenge to maintaining the necessary level of signal fidelity.

As the signal frequency increases, the impact of these capacitances increases. There exist resonant frequencies where the signal can no longer flow based on the reactance (induction based resistance) and impedance (capacitor based resistance) reaching critical levels of resisting flow. Excluding those effects, of course there is still a distortion of the signal that changes based on the frequency; this distortion is difficult to counteract.

Another technique to achieve signal amplification involves the use of semiconductor transistors, such as high-speed MOSFETs. Frequency is not much of a problem with MOSFETS as long as their gate speed is capable of functioning at the frequency of the input signal. Their principle limitations are related to lack of high voltage capacity, low durability to heat, and overvoltage risks. Another limitation of transistor technology is the low voltage ceiling. Any high-voltage applications would require the use of transformers as a secondary component on the output side.

Semiconductor transistors also can suffer from a limited resolution since they are normally used with digital components. The digital use of the transistor is double edged; it can be used readily with digital controllers and it provides functional flexibility, but this means it has a set resolution and signal integrity. With applications for highly-sensitive manipulation of matter using modulated signals, signal fidelity is extremely important. Any distortion is seen by the material as a new "frequency," which can impact the material properties. Implementation of digital amplification components would require that the input signal at some point be converted into a digital format of some set resolution, which inherently negatively impacts the signal's quality. However, if the signal source is digital and all resolution/bitrate data is matched in the rest of the system, it can be accounted for. This results in a known distortion that is applied in a repeatable manner to the electrospinning fluid, so being known and intended the resulting properties of the material are a result of the source signal (the intended frequencies it is constructed of) and the digital resolution of the signal (the unintended frequencies of finite digital resolution).

Vacuum tube amplifiers can also be used with the present invention, but they too have limitations. They run very hot, are physically fragile, are (relatively) large, and can generate distortion that is difficult to remove if improperly designed.

Triodes are notorious for having parasitic capacitances between the grid and anode, resulting in massive energy inefficiencies and even signal distortion at higher frequencies. This can be addressed by adding a screen between the grid and anode, thus creating a tetrode tube system. The aforementioned screen provides a means of limiting the backflow of electrons as well, improving the overall efficiency of the system. The efficiency is worse than a triode at lower frequencies or a pentode (generally) unless the cathode is used to direct the flow as in a power beam tetrode. The cathode is brought up to encompass the grid and screen to force the electron flow as "plates" perpendicular to the anode (aka "beams"), which drastically improve efficiency. That being said, any vacuum tube provides the following benefits at varying levels of efficiency.

Figure 14:
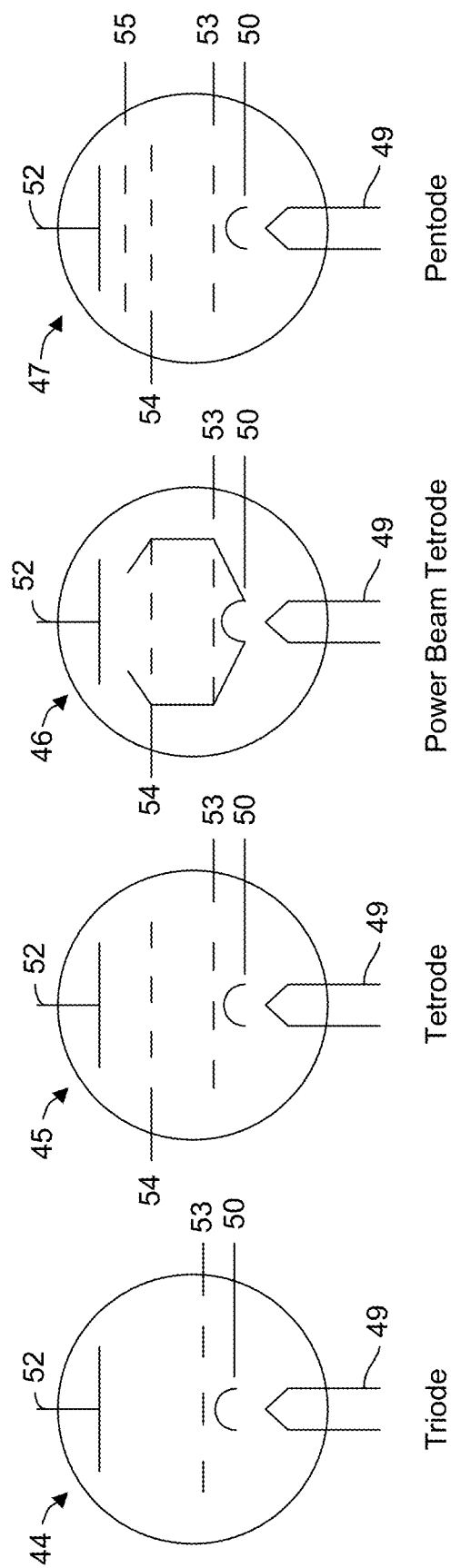
FIG. 14 illustrates vacuum tube types for use with the present invention.

FIG. 14 depicts four types of vacuum tubes: a triode 44, a tetrode 45, a power beam tetrode 46, and a pentode 47. Each name is based on the number of components in the tube. Reference character 49 denotes a heater, 50 denotes a cathode, 52 denotes an anode or plate (output), and 53 denotes a grid (signal source), 54 denotes a screen (reduces capacitance between the tube components), and 55 denotes a secondary screen (to further reduce capacitance).

In the power beam tetrode 46, the cathode 50 substantially surrounds the grid 53 and screen 54 to focus the electron flow to the anode 52.

With a well-designed vacuum tube system, these limitations are heavily minimized and the value of using them in this application become clear. They lack the frequency ceilings that plague transformers, they do not have the resolution distorting potential of semiconductors, they can operate at very high voltages, they are rugged electrically and thermally, and they do not fail if too much voltage is applied.

For an application such as multi-phase variable frequency signal modulated electrospinner, this is ideal since such a system requires the ability to amplify a high-frequency signal to very high voltages with as little distortion as possible. In the correct circuit, vacuum tubes are the ideal amplifying mechanism for electrospinning applications.

Figure 15:
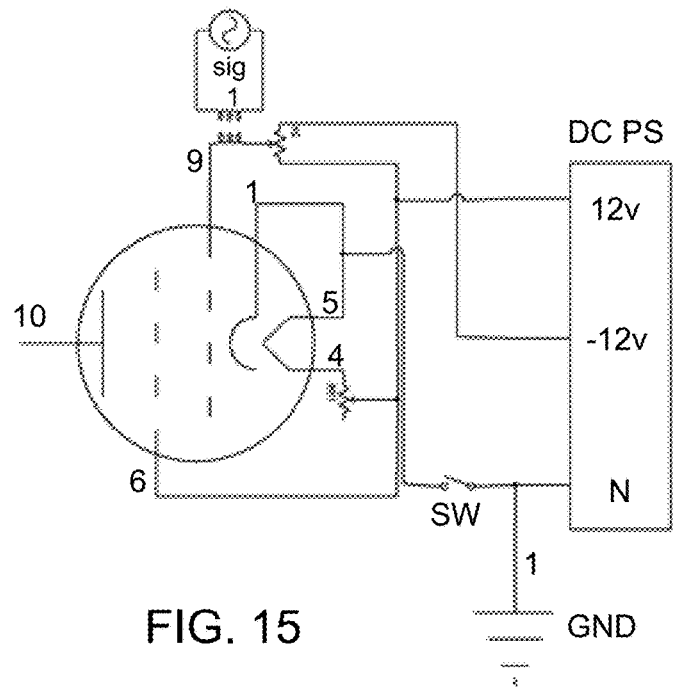

FIG. 15 is a schematic example of a vacuum-based system. With a single tube, the system is relatively simple with some valuable features: the signal is isolated, the tube and power supply are grounded to ensure that the system does not have issues with floating voltages, variable resistors are used to allow for calibration of the heating element and the DC bias applied to the signal.

Figure 16:
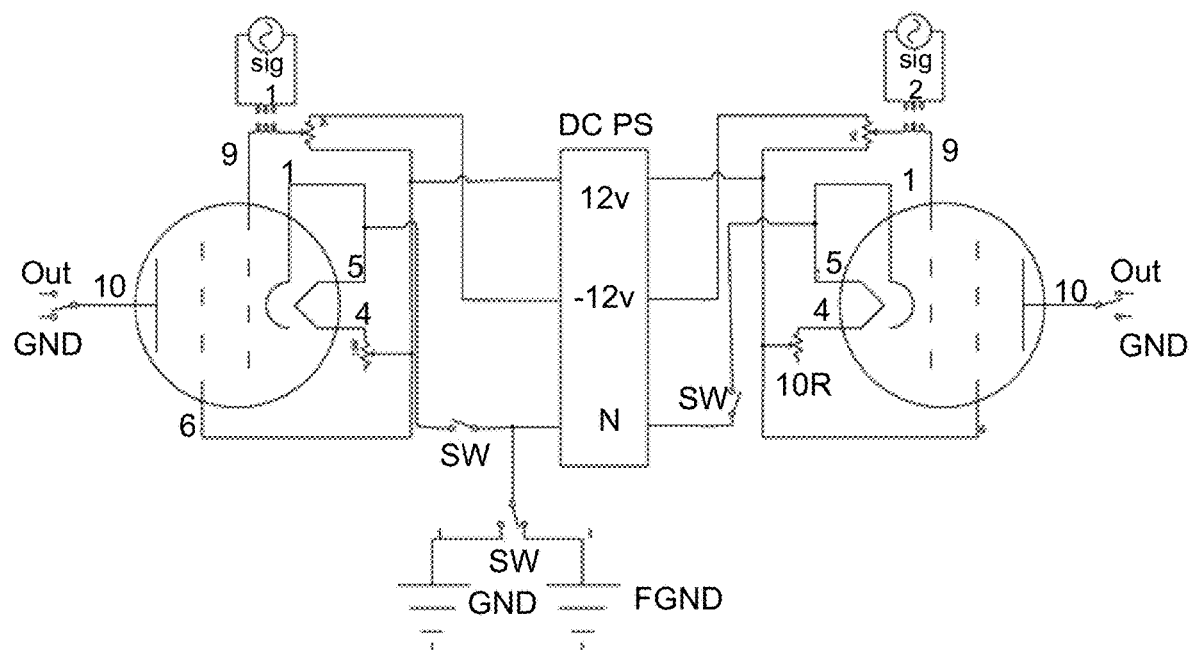

Signal isolation is ideal, but not necessary, for such a device to reduce signal feedback and limit the risk of damaging the signal source. Grounding is a given when dealing with high voltage to reduce the chance of dangerous voltage floating. This also ensures that the collector plate has the same voltage potential as the reference leg of the amplified signal. One limitation presented by this system is that the maximum voltage of the system is based on a single tube, which could be doubled (if necessary) by using the dual-tube system of FIG. 16.

This system is a single "unit" in a larger design made up of repeating segments. By using multiple units in one system, it is possible to create a complex multiphase system. The two-tube unit has three distinct advantages over a single tube unit: the tubes can be used individually or in tandem, half of the number of power supplies are required, and less space is needed for the same number of tubes. To use them in tandem, the reference leg of the DC components are set to floating ground, and the output of one of the tubes is set to ground. Floating ground refers to the internal reference that is counted as the negative line, or neutral line, or negative and neutral line depending on if the current is DC or signal based. The signal (which is same to both tubes) sent to each tube is 180° out of phase to create double the voltage amplification of a single tube. By sharing the power supply, the two tubes can work together or separately by flipping two switches.

In the multiphase system configuration, each unit, or each amplifier pair (in this case vacuum tubes) can be used as a phase or each amplifier can be used independently, as well. For example, in a five-unit system with each unit comprising a two-tube system. If the tubes are rated at 5 KV each, there are eight total phases needed and two of them need to be 10 KV—this is quite feasible for this system. Two units will be configured for tandem function of the tubes, while three units will have each tube operate independently. This is just one example of an indefinite number of possible system configurations, especially if the docking system for the units in question is made modular or expandable.

Figure 17A:
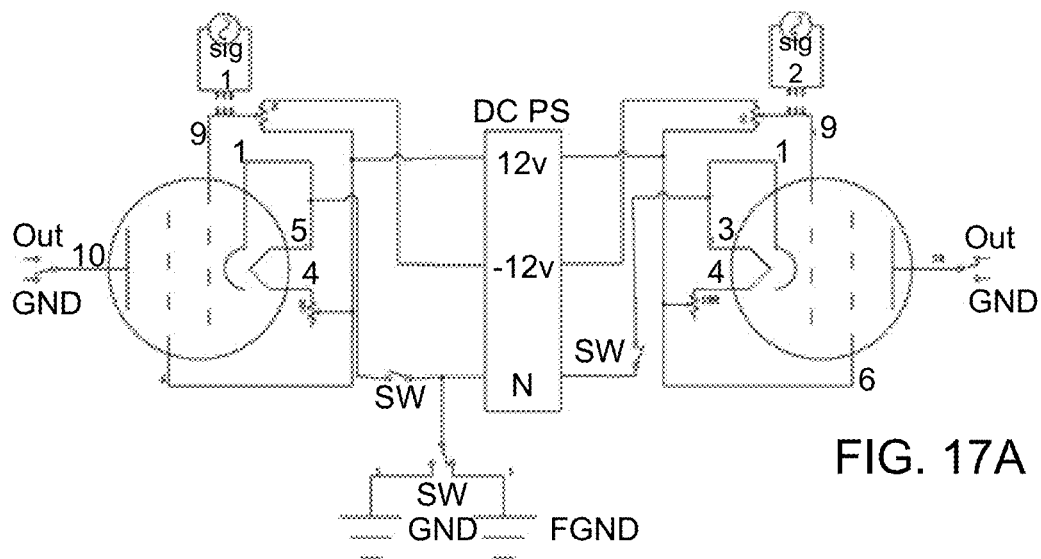
Figure 17B:
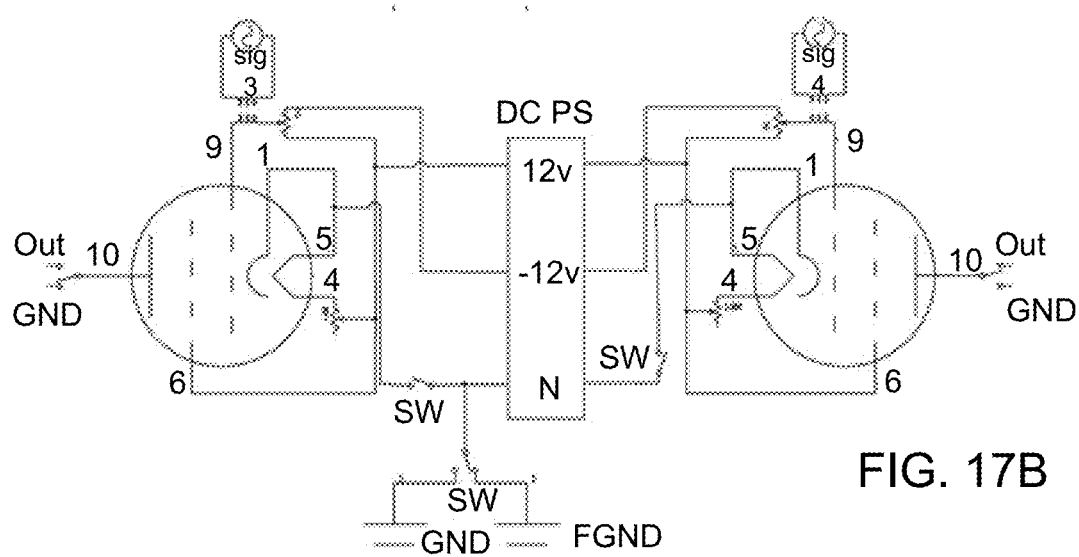
Figure 17C:
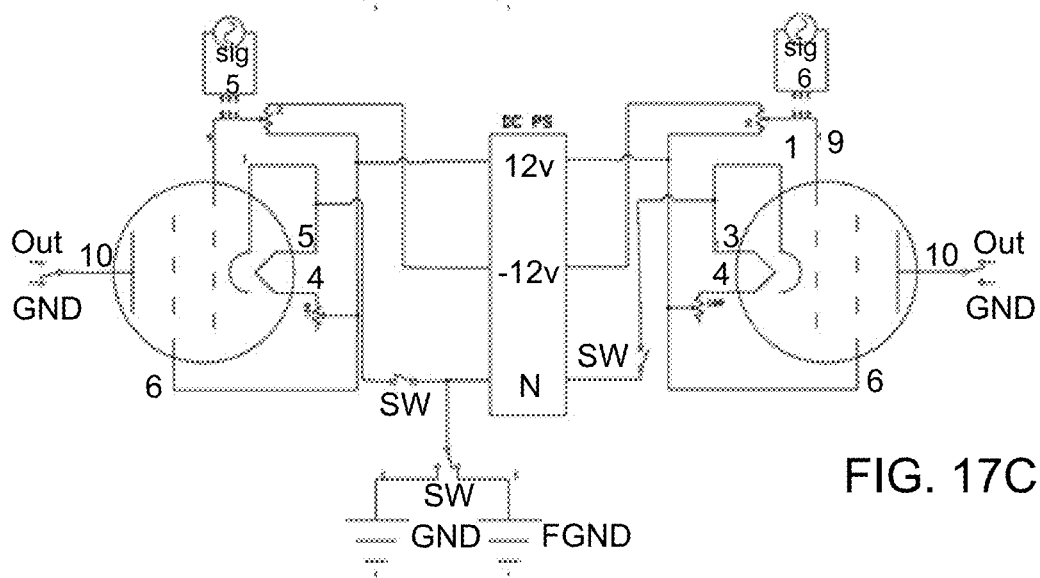

FIGS. 17A, 17B, and 17C illustrate a three unit system with either six 5 KV outputs, or three 10 KV outputs, and/or any combination of the two.

Another embodiment employs both analog and digital components for providing computer-based control. Such a system can be implemented in at least two exemplary embodiments, but anyone skilled of signal generation knows there is no limit to how the signal is produced and controlled digitally.

At lower audio frequencies, one can use Audacity, a free audio editor, and a sound card to operate it at upwards of eight phases (7.1 surround sound, using each available channel as an input having a unique phase angle).

At higher frequencies, a more advanced system can be implemented using MATLAB or LabVIEW and an external digital signal generator would be necessary.

Manual generation of input signals via analog means and combining frequencies with complicated junctions is not easily viable, especially when scaling to a commercial/industrial level. To achieve the best results from a multi-phase variable frequency signal modulated electrospinner, digital signal generation combined with a well-calibrated analog amplifier provides precise signal control, generation, and amplification with minimal signal distortion and degradation. Digital resolution of the signal generated is easily accounted for when the characterization of a material is done. An example of this occurring would be a digitally produced 500 Hz, 5 v signal with a 44 KHz bitrate and a resolution of 5 mV. It would act as a signal with two unbalanced components, a large 500 Hz frequency and a small but present 44 KHz frequency. Changing signal resolution and bitrate can result in different properties in the material end product by inducing different "frequencies" in the signal based on the resolution and bitrate size.

Figure 18:
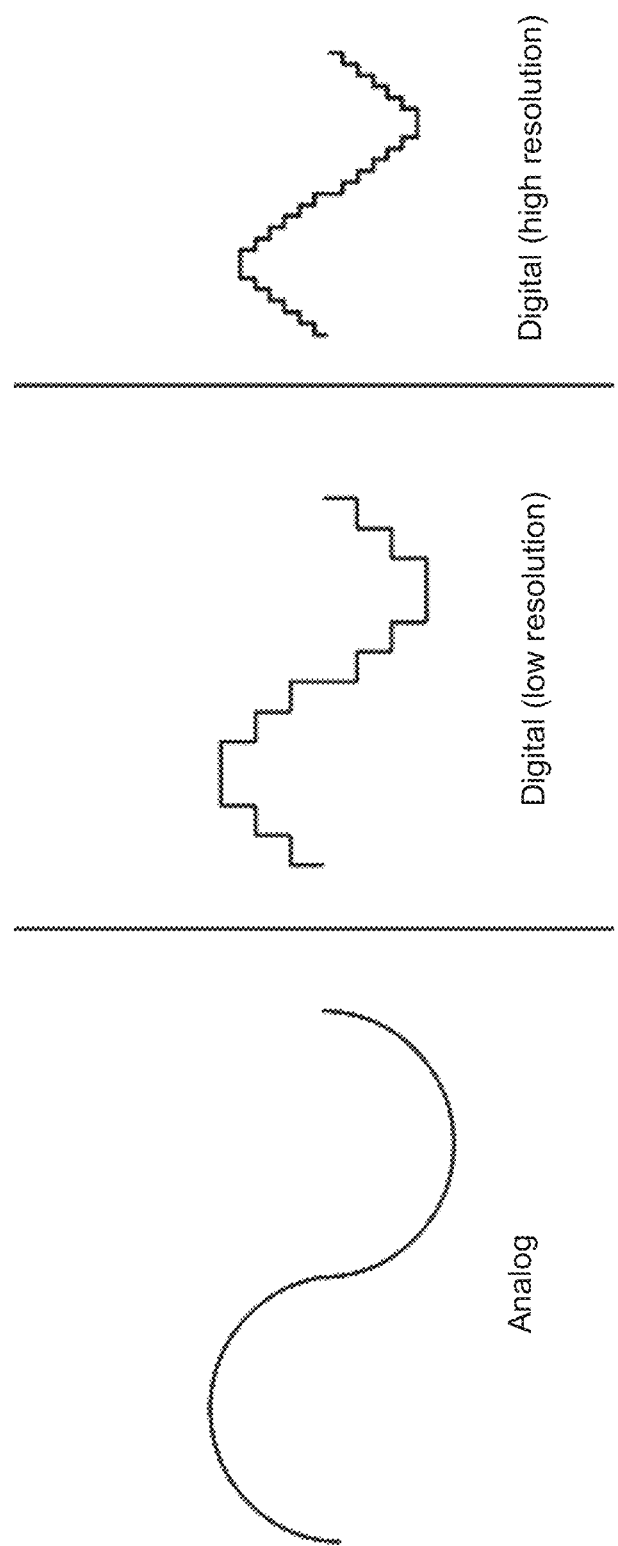
FIG. 18 illustrates waveforms of the present invention.

FIG. 18 depicts limitations on the use of digital amplification on a high fidelity application, such as electrospinning. If multiple digital systems are used in tandem without matching resolution, there is a loss of signal integrity by introducing a resolution to the signal. The "steps" generated in the signal from the resolution can degrade the quality of the signal, and if multiple digital systems are used, then the signal has multiple types of mismatched steps embedded within.

A tube-based system, does not subject the signal to another layer of resolution modification, and thus does not result in signal degradation. Analog degradation can be compensated for either with impedance matching or similar mechanisms. These issues occur with or without digital systems, and would have to be compensated for in either scenario. As mentioned elsewhere, the signal's digital fidelity in the form of its bitrate and resolution is not a concern when the signal is generated as long as it is accounted for by estimating the "frequency" and "amplitude" modulation imposed by the digital bitrate and resolution. The resolution height (or step height) is the amplitude of this sub-frequency, while the bitrate (or value change per second) determines its frequency. For most applications, the signal stepping is negligible, but in electrospinning it will not be. Structures in the resulting material output will be impacted based on the digital resolution and bitrate. This would manifest as the main signal as the carrier signal, and the digital stepping would appear as a riding signal on the carrier.

Metal Mesh Production Using Multi-Phase Variable Frequency Signal Modulated Electrospinner of the Present Invention Building on the previous discussions and in tandem with the Carbon Mesh section below this sections describes an application of the multi-phase variable frequency signal modulated electrospinner.

Metal meshes have a wide range of applications based on fiber size, metal type, and structure. For example, iron is the standard base metal for most mechanical equipment because of its diverse properties that depend on the impurities that are added such as carbon or chromium. If manipulated into a mesh, iron can become a lightweight "foam" that allows for high strength applications with weight restrictions. As mentioned before, this can be combined with the multiphase components to have hybrid metals and composites.

Using Iron

Iron has significant properties and applications and deserves to be discussed separately. Being such a versatile metal, controlling it on a nanoscale in the multi-phase variable frequency signal modulated electrospinner would be ideal for precision engineering applications. To achieve this, the iron has to be in a form that can be dissolved into a solvent without risk to the user or machinery. The implementation of metal salts is an ideal technique for achieving this, and an exemplary form of this is iron nitrate. It is water soluble, readily made, and is fairly inert. It has to also have a charge retaining component (aka an insulating material) which with a standard plastic solute electrospinning fluid, is the plastic itself. To rectify this, a plastic additive is combined with the metal salt to provide charge maintenance. Polyvinyl Alcohol is an exemplary material to add because of its water solubility and the high charge potential it has as a plastic.

The electrospinner system is set up as described above, but uses the aqueous Polyvinyl Alcohol Iron Nitrate solution as the electrospinning fluid. Once electrospun, the fibers can receive specific treatment to stabilize them and remove the plastic components. If heated above the vaporization temperature in an atmospheric environment, the plastic evaporates, the iron oxidizes, and the ensuing oxide stabilizes. If done in an inert gas environment at similar temperatures, the plastic carburizes on the iron and no oxides form. The plastic can be left of course, if the application needs an iron based mesh bound to a plastic.

Figure 19:
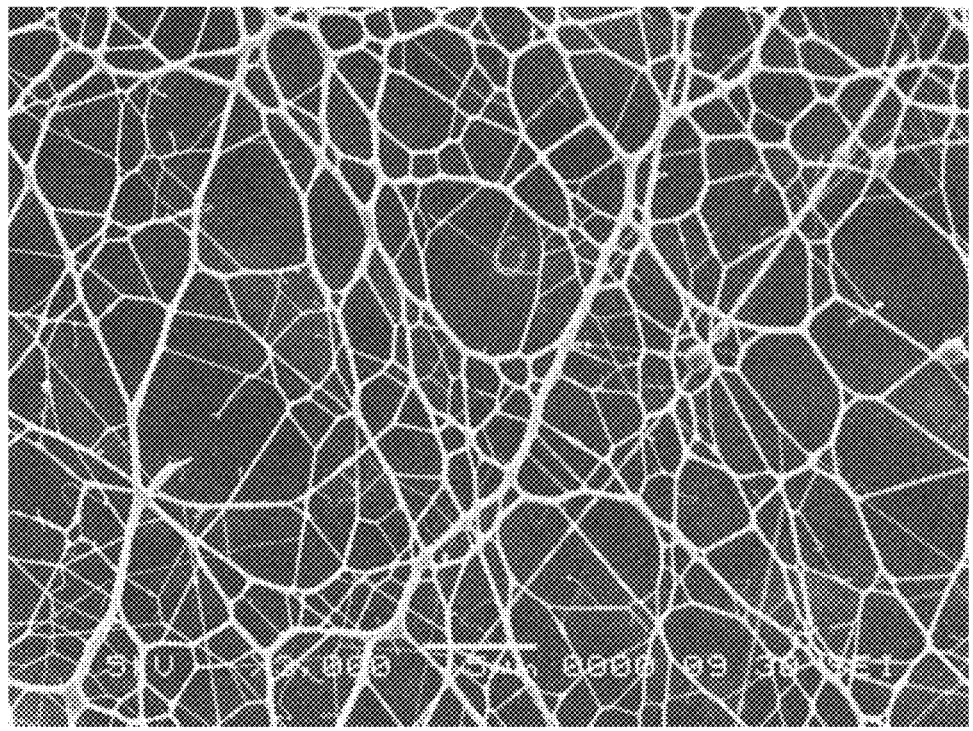
FIGS. 19 and 20 illustrate scanning electron micrographs of fiber materials constructed according to the teachings of the present invention.

FIG. 19 is a scanning electron micrograph that depicts an iron nanomesh as produced using the present invention by one of the inventors. The scale bar at the bottom of the photo is 5 um and the illustrated sample has been heat treated to remove the residual plastic in an atmospheric environment.

Figure 20:
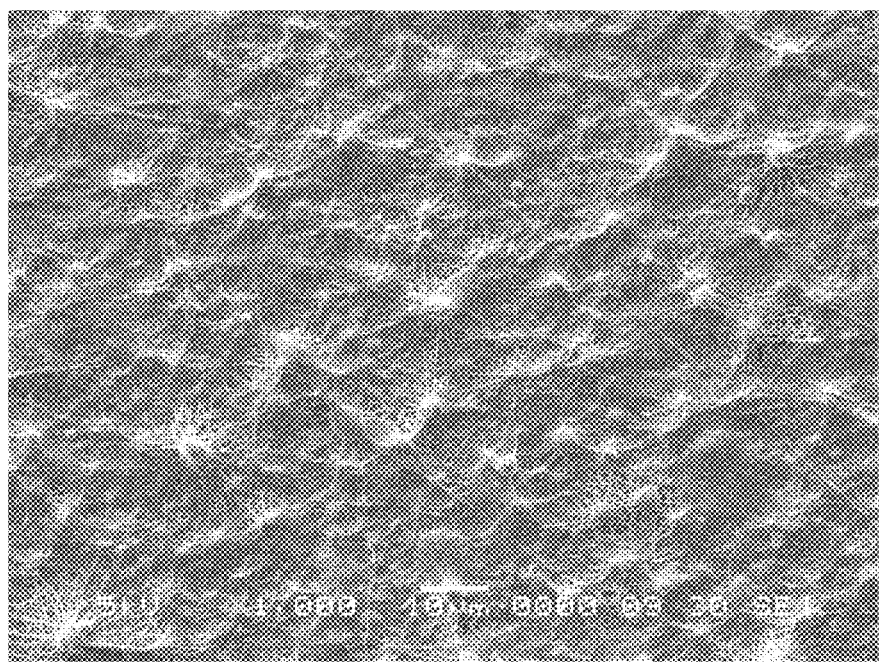
Figure 21:
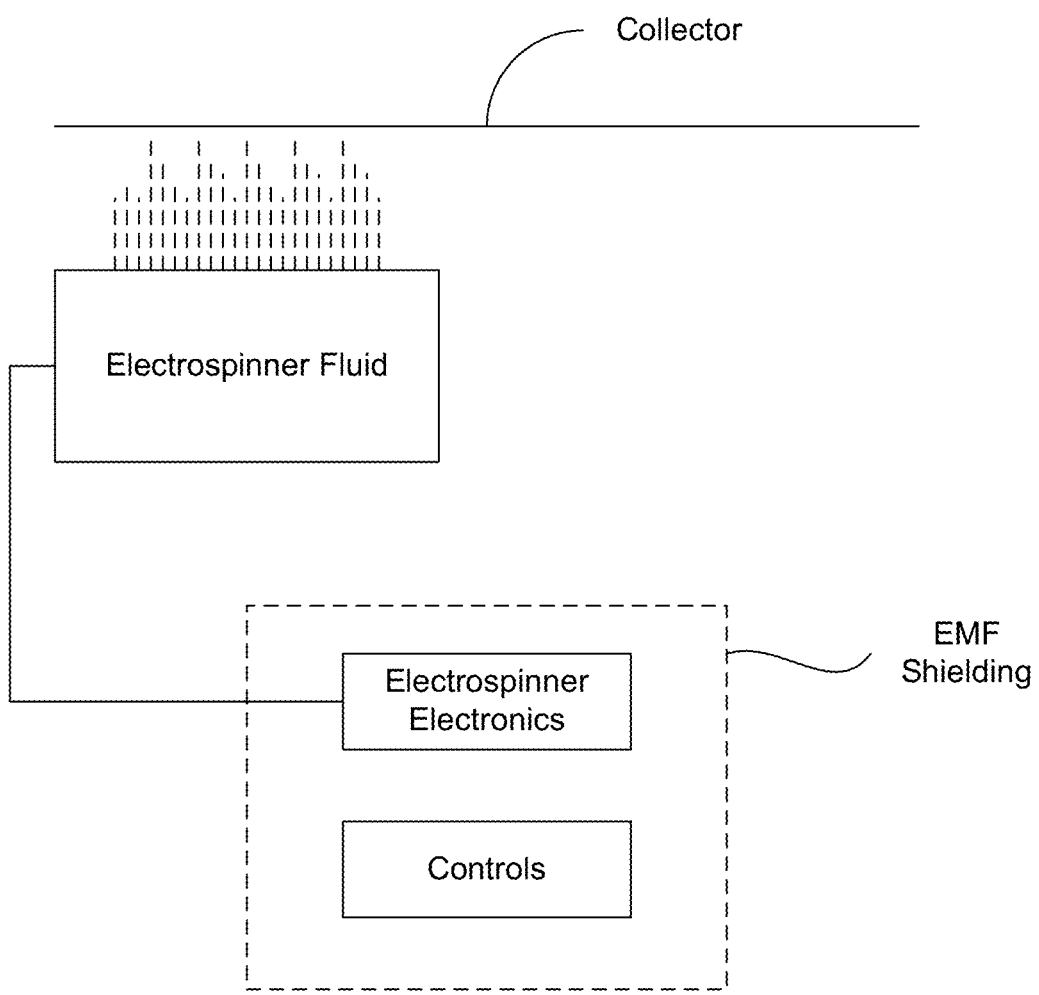
FIG. 21 illustrates a carbon fiber electrospinning system.

FIG. 20 is a zoomed out image of the metal fiber mesh has a scale bar of 10 um displaying the homogenous and isotropic nature of the metal nanomesh production with the multi-phase variable frequency signal modulated electrospinner.

Other Metals

To use other metals, the only change needed is to exchange the iron nitrate for a different metal salt, such as copper sulfate or silver nitrate. Metal salts that are soluble in water are ideal, and an exemplary list is given below:

Ferric nitrate
Cupric sulfate
Aluminum sulfate
Barium chloride
Beryllium sulfate
Cadmium sulfate
Calcium chloride
Chromium nitrate
Cobalt nitrate
Lanthanum chloride
Lead acetate
Magnesium chloride
Manganese sulfate (or pure manganese if the solvent is water)
Mercuric nitrate
Nickel nitrate
Potassium tellurite
Rhodium trichloride
Potassium tetraoxalate
Sodium carbonate
Stannous chloride
Strontium chloride
Titanium tetrachloride
Zinc nitrate Water and polyvinyl alcohol will work for most applications, but can be changed or adjusted to other solvents and plastics depending on the capacitance and conductivity needs of the electrospinning fluid. The basic process of producing the iron nitrate fluid is well documented and well known, but an exemplary method will be provided below as a generic chemical process for use with other metal salts.

Polyvinyl Alcohol Solution:
1. Add 1 part by weight of Polyvinyl Alcohol to standard glassware
2. Fill with 9 parts by weight DI water
3. Add magnetic stir rod, placing the solution on a heated stir plate running at 50-90° C. and a high rpm (700-1500) respectively
4. Run for 3-4 hours until clear and homogenous $FeNO_3$ Aqueous Solution:
1. Place 3 parts by weight of $FeNO_3$ into glassware, adding 4 parts by weight of DI water to it
2. Stir manually until homogenous Polyvinyl Alcohol $FeNO_3$ Final Solution:
1. Add the Polyvinyl Alcohol solution to the $FeNO_3$ solution in a range of 4:1 to 9:1 parts by weight
2. Place on heated stir plate for 5 hours at a high rpm, or until homogenous This method should also work with the other metal salts with little to no modification.

Combining with Multiphasing

As with other materials, this use of various metals can benefit from the multiphase component in the multi-phase variable frequency signal modulated electrospinner to create hybrid materials. For metal to metal, the phase angle can be relatively small because of metallic bonds between each type of metal, which help to form a stable inter-material weave. As other materials are used in the multiphase electrospinning system, the phase angle will need to be increased to handle the dissimilar materials and force a bond between them.

Applications in Industry

For iron, there are several applications that bear themselves in a variety of industries. In the case of oxidized iron (formed when electrospun material is stabilized in an atmospheric environment), the resulting iron can be any type of oxide from magnetite to hematite or a combination of both depending on a specific need. Magnetite, hematite, and their combinations are exemplary for making heavy metal absorbing components for water filters. If the iron is not oxidized, such as when the samples are heat treated in an inert environment, the iron can be used as a catalyst for producing dozens of chemicals. This interwoven fused mesh formed in a micro- or nano-scale would be ideal for such needs. An example where the mechanical structure would matter is when such an iron catalyst would be used to produce carbon nanotubes (CNT). By controlling the shape of the catalyst, one can control the shape of the CNT and even the functionality of the tubes.

The signal modulated electrospinning process is not limited to pure iron of course. By adding other "impurities" to the electrospinning solution, one can form structures such as cementite, or even different steel types. This can be extended to other metals and their alloys, and each can be produced and dissolved into an electrospinning solution to create multi-phase variable frequency signal modulated electrospinner-compatible materials.

One of the more interesting applications of having a high surface-area-to-volume ratio in a metal is that the resulting material would out-perform today's existing materials. With aluminum for example, anodization creates a strong, durable, super hard, high temperature, and chemically resistant coating over the surface of the aluminum by converting the surface layer into aluminum oxide. This layer thickness is normally 2 μm, but if the fiber size in the electrospun mesh is smaller than that, then the entirety of the bulk aluminum can be converted, as well.

Similarly, with steel alloys, nitride processing produces a chemical hardening of the metal surface without compromising ductility or strength at higher temperatures like traditional hardening. The layer depth of nitride work is about 5 μm deep, which is much larger than the radius of the fibers in the iron nanomesh. If gas nitride (or even with cyanide salts or Quench Polish Quench), the entire bulk material becomes fully hardened steel (60RC) that can handle temperatures in the red hot temperature range before the temper/hardness is lost, compared to standard hardened steel where anything over 110° C. can damage the temper of a piece of equipment. These materials can be used for petrol engines, high-temperature turbines, and any industrial machinery that has to withstand higher temperatures and with a hardness as large as possible.

Methods for the Production of a Novel Carbon Mesh Composite Material

The composites industry in the United States alone is estimated to be approximately $8.2 billion, and is projected to reach $12 billion by 2020. Carbon fiber composites dominate the industry across a majority of composite applications, and its use is limited only by the rate and efficiency at which it can be produced.

Carbon fiber is used extensively in a variety of applications including wind turbines, protective equipment in recreation and industrial applications, and as lightweight and high-strength materials in high-end automotive, boating, and aerospace platforms.

Current manufacturing methods offer only a low profit margin and a limited ability to produce carbon fiber at a rate which would be sustainable in high-demand applications such as the general automotive industry. With the implementation of methods disclosed here, it is possible to eliminate several stages of the existing manufacturing process—saving time and resources, while significantly cutting production costs.

Benefits of Using Multi-Phase Variable Frequency Signal Modulated Electrospinner with Carbon Fiber The disclosures herein refer to the various stages of a novel process for the production of a new carbon mesh composite material similar to existing carbon fiber composites. The material produced as a result of these processes has properties comparable to traditional carbon fiber, and holds some advantages over the traditional material as well.

The carbon mesh comprises fibers with diameters that can controllably range from the micron scale to the nanometer scale. These fibers are connected to one another at different points (hereon referred to as "nodes") and are arranged pseudo-randomly in terms of fiber alignment. This pseudo-random alignment provides isotropic mechanical properties, an important advantage over mechanically woven carbon fiber cloth, or tow. Where panels of traditional carbon fiber would typically require several layers oriented along different axes to achieve an artificial isotropic state in terms of strength, the proposed carbon mesh would be inherently isotropic and would require additional layers only to achieve the desired strength with no consideration for orientation necessary. The existence of the aforementioned nodes also provides an additional source of mechanical strength, allowing loads to be distributed across more of the carbon mesh at any given point. Since carbon fiber cannot be directly electrospun into a continuous material, electrospinning a precursor material is necessary followed by post processing.

Manufacturing and Production

The creation of the disclosed carbon mesh requires specialized equipment and processes. The first stage of the process involves the production of the carbon mesh precursor material. In order to produce the precursor required for carbon mesh, an appropriately-designed electrospinning system must be used. This electrospinning system may consist of one or more vat reservoirs, continuous material feeding system, a user-controllable interface, one or more syringe dispensing arrays, driving electronics, a collecting element, electromagnetic field (EMF) shielding, mechanical means of maintaining uniform solution concentrations of the electrospinning materials, conductive elements to convey electrical charge to the electrospinning solution, or any combination thereof that is deemed necessary to accomplish the desired result depending on the application in consideration.

In an appropriately designed electrospinning system implementation, the user should be able to create conditions in the manufacturing process wherein the precursor mesh will consist of fibers of a specific diameter range, deposition rate, and node formation rate, among other things. This configurability provides the ability to determine the mechanical properties of the final carbon mesh product through computer-based control. This electrospinning system may exist as part of a larger assembly line or conveyor system that directly and continuously feeds precursor material into the succeeding stages of manufacturing, or it may deposit material onto a static collection mechanism that allows for production of precursor material to be used in a separate post-processing system. Such a conveyor system would consist of a series of pulleys or rollers, any number of which having the capability to be used as a tensioner pulley or roller not unlike those used in automobile belt trains. A conveyor-belt-like apparatus would rotate about the collector mechanism, carrying away the electrospun precursor mesh at the configured line speed. The conveyor belt should consist of a chemically-resistant material such as Mylar. At some point in the conveyor system, the material will detach from the conveyor belt and travel on to subsequent stages of the process continuously via the aforementioned pulleys/rollers.

At least one motor should be incorporated directly or indirectly to drive rotating motion in one or more of the rollers/pulleys, and should allow for digital and/or analog control of conveyor system speed with or without the implementation of feedback loops utilizing sensor and MCU technology.

Due to the unique structure of the proposed carbon mesh, many unique manufacturing considerations need be addressed. The process may be implemented with any carbon fiber precursor material, though polyacrylonitrile will be used as an exemplary case in this disclosure. With Polyacrylonitrile based carbon fiber production, it is important to keep the precursor material under tension through different stages of processing. In traditional carbon fiber manufacturing, individual fibers are extruded via one of many different commonly used methods, pre-processed with acid etching, then conveyed through several stages of fiber shaping, sizing, and heat treatment.

Maintaining fiber tension in this process is relatively straightforward in this case since the only force which is required is along the direction of the manufacturing line. In this the novel system herein described, carbon mesh precursors have randomly arranged fiber orientations, and it is important to apply tensile forces in as many directions as possible on the material. One proposed method involves the application of specially-shaped pulleys or rollers which stretch the carbon mesh sheet in many different directions as it passes through different stages of the manufacturing process.

Chemical Considerations and Heating

When solvent electrospinning is implemented, or any form of dissolving the material to electrospin into a solvent, it is important to ensure that the solvent is fully removed before the heat treatment stages begin. To achieve this, the precursor is exposed to some spray or bath consisting of a chemical specifically chosen to neutralize the potentially hazardous solvent. In the exemplary embodiment utilizing Polyacrylonitrile-based precursor mesh dissolved in dimethylformamide (DMF), a simple water-spraying mechanism can be implemented in series with heating elements to remove the given solvent in the precursor before it enters the first stage of heat treatment. Like standard Polyacrylonitrile-based carbon fiber manufacturing, the precursor mesh will pass through a minimum of two stages of heat treatment.

The first stage will be herein referred to as the "stabilization phase", and the second will be referred to as the "carbonization stage". In the preferred embodiment, each of these stages will take place in separate furnace systems capable of reaching the appropriate temperatures. In different embodiments the temperature required for stabilization may range from 100° C. to 1000° C., while the temperature required for carbonization may range from 1000° C. to 3000° C. The time that the material remains at each stage of heat treatment will vary and can be adjusted to correlate appropriately with parameters of the manufacturing system as well as the desired properties of the final carbon mesh material. During stabilization, the material should be exposed to an oxygen-containing environment, such as the atmospheric condition, to allow for the appropriate chemical reactions to take place. During the carbonization phase of the heat treatment, the mesh should only be exposed to an inert gas environment to prevent oxidation and/or ignition of the material. The heat treated mesh may then be sized with typically one or several polymeric components, a coupling agent, a lubricant and a range of additives to protect it while it is collected on a spool or as it goes through further processing, including molding. Coating the fibers to optimize them for future use is standard practice and can be easily applied to the produced carbon fiber mesh produced with the aforementioned signal modulated electrospinner.

This written description uses examples to disclose the invention, including the best mode, and also to enable any person skilled in the art to make and use the invention. The scope of the invention may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A multi-phase, variable frequency electrospinner apparatus for producing a fibrous material, the apparatus comprising:
   a material source, a material to be electrospun disposed within the material source;
   a tip attached to an end of the material source;
   a collector spaced apart from the material source; and
   an electric field generator simultaneously producing:
      a first voltage signal in the form of a square wave having a first frequency as a function of time and a first phase, and
      a second voltage signal in the form of a sine wave having a second frequency as a function of time and a second phase, wherein at least one of the first and second frequency are varied as a function of time,
   the apparatus being configured for electrospinning fibers formed from the material as extracted from the tip responsive to an electric field generated between the tip and the collector by the first and second voltage signals, wherein the first frequency, first phase, second frequency, and second phase are selected to control at least one property of the fibers extracted from the tip.

2. The apparatus of claim 1, wherein the collector is configured to receive the fibers from the tip.

3. The apparatus of claim 1, further comprising a rotary mechanism configured to rotate at least one of the material source and the collector around a longitudinal axis defined by the material source.

4. The apparatus of claim 3, wherein the rotary mechanism is configured to rotate both the material source and the collector at different angular speeds from one another.

5. The apparatus of claim 3, wherein the rotary mechanism is configured to rotate the material source and the collector in opposite angular directions with respect to one another.

6. The apparatus of claim 1, wherein the material source comprises a rotatable material source configured to rotate about a longitudinal axis defined by the material source.

7. The apparatus of claim 1, wherein at least one of a magnitude and a frequency of the electric field is controllable to affect the at least one property of the fibers, the at least one property comprising at least one of a rate of fusing of the fibers extracted from the tip with one another, tightness of a weave of the fibers extracted from the tip with one another, and thickness of the fibers extracted from the tip.

8. The apparatus of claim 1, wherein a flow rate of the fibers extracted from the tip is controllable responsive to the electric field.

9. The apparatus of claim 1, the material comprising any one of a metal, a composite, or carbon.

10. The apparatus of claim 1, wherein both the first frequency and the second frequency are varied as a function of time.

11. A multi-phase, variable frequency electrospinner apparatus for producing fibrous material, the apparatus comprising:
   a first material source for storing a first material to be electrospun;
   a second material source for storing a second material to be electrospun;
   a first tip attached to an end of the first material source;
   a second tip attached to an end of the second material source;
   a collector spaced apart from the first and second material sources;

a first electric field generator producing a first voltage signal in the form of a square wave having a first frequency as a function of time and a first phase; and a second electric field generator producing a second voltage signal simultaneously with the first signal and in the form of a sine wave having a second frequency as a function of time and a second phase different from the first phase, wherein at least one of the first and second frequency are varied as a function of time, the apparatus being configured for electrospinning fibers formed from the first and second materials as extracted from the respective first and second tips responsive to a first and second electric field generated between the respective first and second tips and the collector by the respective first and second voltage signals, wherein the first frequency, first phase, second frequency, and second phase are selected to control an interaction between the first material and the second material at the collector to form a composite material with a unique pattern based on the interaction.

12. The apparatus of claim 11, wherein the first frequency and the second frequency are equal.

13. The apparatus of claim 12, wherein the interaction is increased based on an increase in a phase difference between the first phase and the second phase.

14. The apparatus of claim 11, wherein the first frequency and the second frequency are not equal.

15. The apparatus of claim 11, the first material comprising a different material from the second material.

16. The apparatus of claim 11, wherein both the first frequency and the second frequency are varied as a function of time.

17. A multi-phase, variable frequency electrospinner apparatus for producing a fibrous material, the apparatus comprising:

a material source holding a material to be electrospun;

a tip attached to an end of the material source;

a collector spaced apart from the material source; and an electric field generator simultaneously producing:

a first voltage signal having a first frequency as a function of time and a first phase, and a second voltage signal having a second frequency as a function of time and a second phase, wherein the first and second frequency are varied as a function of time, wherein at least one of the first and second voltage signals are in the form of a square wave, the apparatus being configured for electrospinning fibers formed from the material as extracted from the tip responsive to an electric field generated between the tip and the collector by the first and second voltage signals, wherein the first frequency, first phase, second frequency, and second phase are selected to control at least one property of the fibers extracted from the tip, and wherein the first signal is unmatched and out of phase with the second signal.

18. The apparatus of claim 17, wherein the first frequency is equal to the second frequency.

19. The apparatus of claim 17, wherein one of the first and second signals is in the form of a sine wave.

20. The apparatus of claim 17, the material comprising any one of a metal, a composite, or carbon.

* * * * *